United States Patent [19]
Fowler, Jr. et al.

[11] 3,711,581
[45] Jan. 16, 1973

[54] METHOD OF MOLDING A COMPOSITE FRAMED RESIN ARTICLE

[75] Inventors: Aubrey A. Fowler, Jr., P.O. Box 443, Fairmont, N.C. 28340; Henry O. McKee, Fairmont, N.C.

[73] Assignee: said Fowler, by said McKee

[22] Filed: July 2, 1970

[21] Appl. No.: 81,211

Related U.S. Application Data

[63] Continuation-in-part of Ser. No. 387,404, Aug. 4, 1964, abandoned.

[52] U.S. Cl. ...................................264/45, 9/6, 161/93, 161/161, 264/88, 264/92, 264/257, 425/4, 425/388
[51] Int. Cl. ...........................B29d 7/22, B29d 27/04
[58] Field of Search...............264/45, 88, 92, 257, 45; 261/DIG. 4; 9/6; 161/93, 161; 425/4, 388

[56] References Cited

UNITED STATES PATENTS 2,728,702   12/1955   Simon et al. ........................264/45 X
3,187,069   6/1965   Pincus et al. ...........................264/45

OTHER PUBLICATIONS

Delmonte, John "Concrete Sealed by Glass Cloth and Resin." In Concrete June 1949, pp. 12 and 45.
"A Materials Handbook, Parts and Forms for Design Engineering." New York, Reinhold, p. 125–127; 141–156.

Primary Examiner—Philip E. Anderson
Attorney—A. Yates Dowell and A. Yates Dowell, Jr.

[57] ABSTRACT

The method of forming a first unstable moldable material having predetermined physical properties and a second stable moldable material compatible with the first material but having different physical properties to provide a unitary structure having the properties of both materials as well as the physical properties created by the interaction of the materials.

3 Claims, 18 Drawing Figures

PATENTED JAN 16 1973
3,711,581
SHEET 1 OF 4
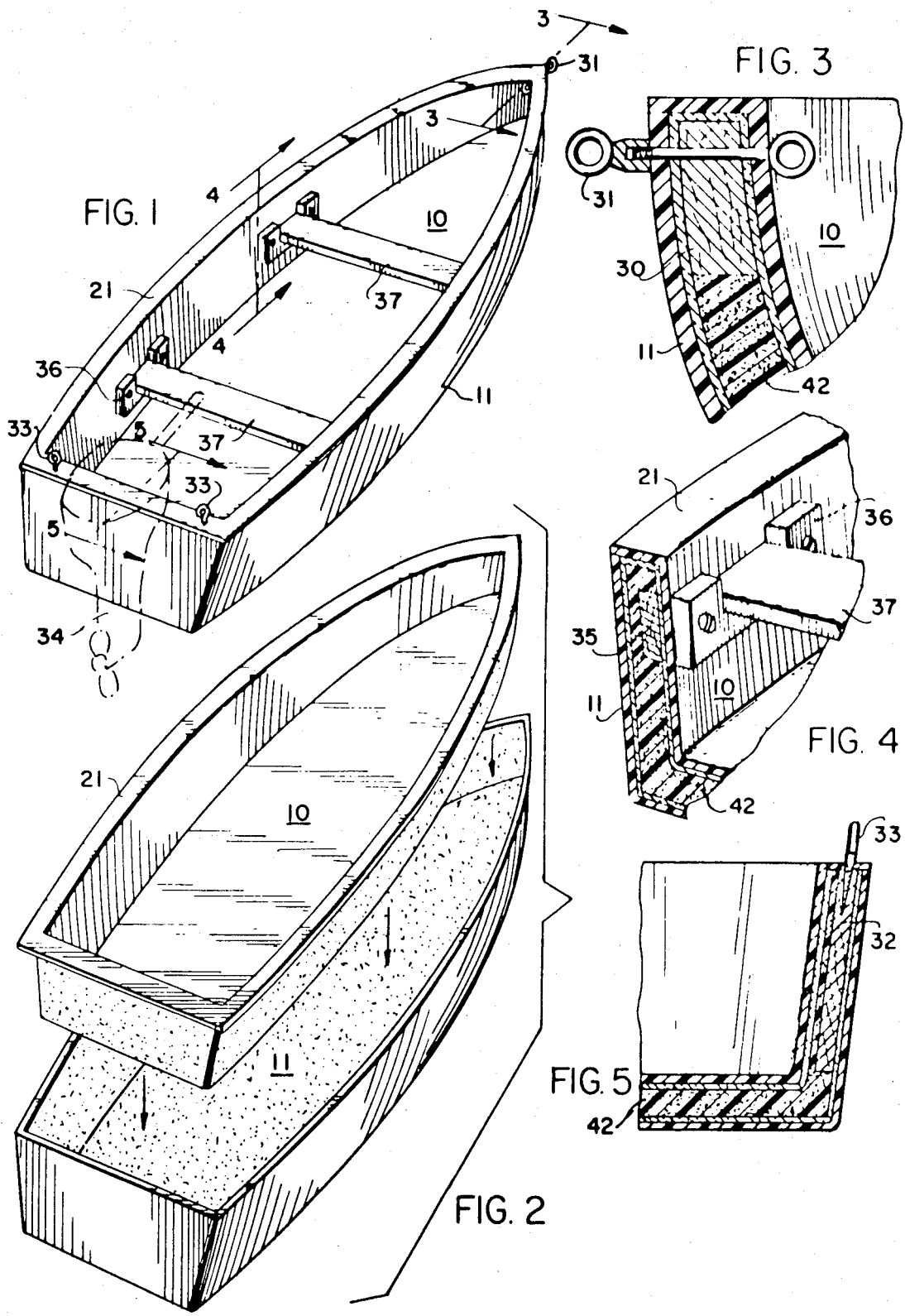

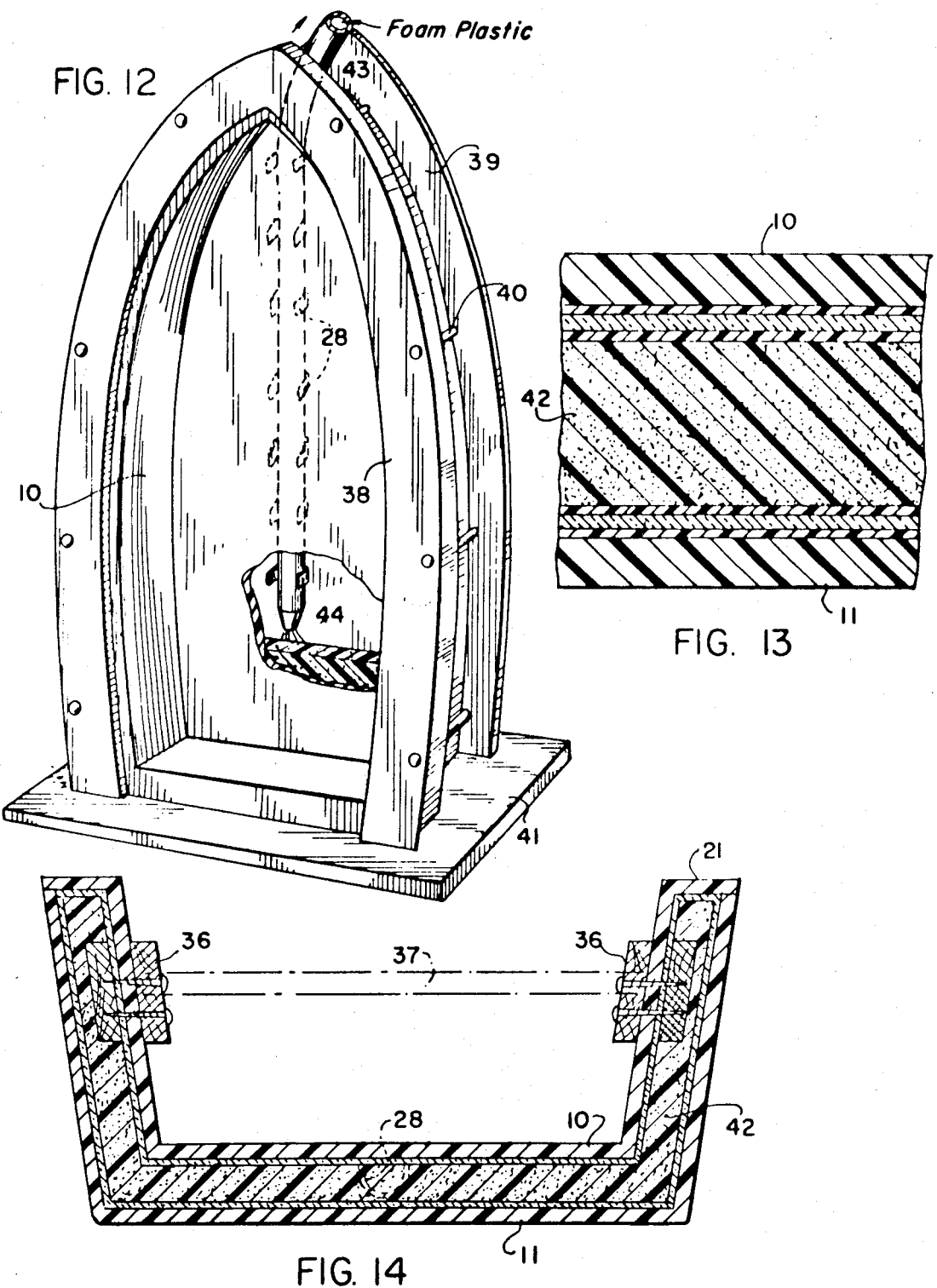

PATENTED JAN 16 1973 3,711,581
SHEET 4 OF 4
FIG. 15
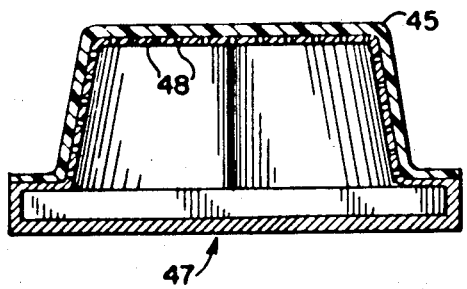
FIG. 16
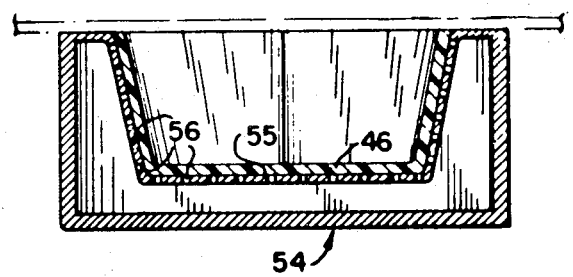
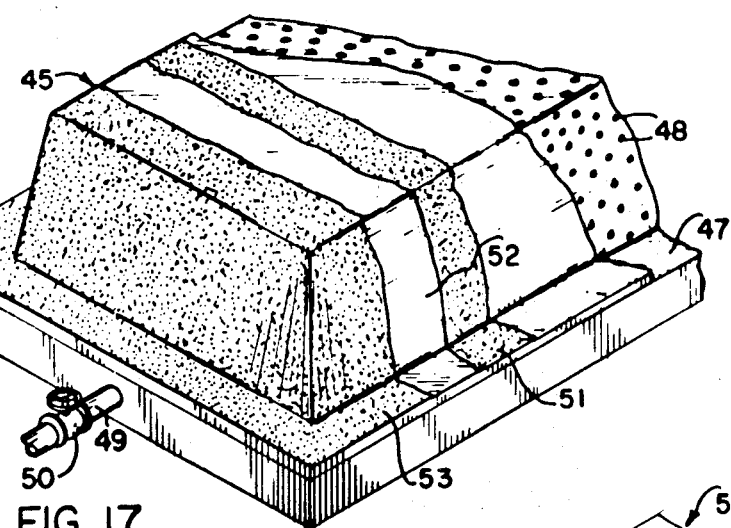
FIG. 17
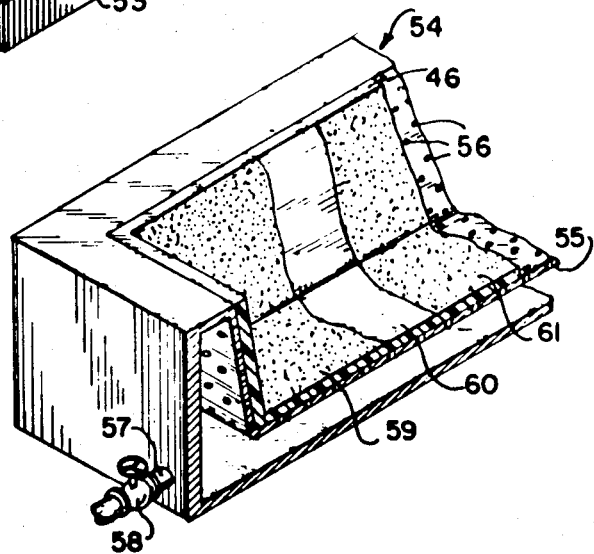
FIG. 18

METHOD OF MOLDING A COMPOSITE FRAMED RESIN ARTICLE

CROSS REFERENCE TO RELATED APPLICATION

This application is a continuation-in-part of application Ser. No. 387,404 filed Aug. 4, 1964 and now abandoned.

BACKGROUND OF THE INVENTION

1. Field of the Invention

This invention relates generally to the method of forming molded articles and relates particularly to the method of forming boats and other objects of various kinds, as well as to the forming of multiple layers of various materials which are compatible with each other with such materials having different physical properties and characteristics.

2. Description of the Prior Art

Many efforts have been made to form moldable materials into various objects such as boats or the like by vacuum and other molding processes; however, these prior methods have not been satisfactory due mainly to the fact that articles molded from a sheet of moldable material have had a tendency to spring back and return to their original form when removed from the mold, and accordingly have not remained within close tolerances required by production line assembly practices. Many materials which had the strength to perform the necessary functions for which they were intended were not pleasing to the eye and had substantially no aesthetic value, while other materials which were pleasing to look at were brittle, fragile and lacked impact strength. Still other materials which could be used in the manufacture of molded articles were unstable due to expansion and contraction, became discolored, deteriorated under light, were difficult to handle, and were time consuming in the molding process.

SUMMARY OF THE INVENTION

The present invention is a molded article such as a boat or other structure using a first moldable material which is pleasing to the eye and which can be formed in a vacuum or other mold, and a second material having high strength and impact resistant characteristics and which is united with the first material while the first material remains under pressure within the mold so that after the materials have hardened and set they will retain the exact configuration of the mold, will be pleasing to the aesthetic sense of a person and will have high strength and impact resistance and will substantially retain the exact configuration of the mold within close tolerances for mass production.

It is an object of the invention to provide a moldable structure having a first material which can be formed to a specific configuration, and a second material compatible with the first and having different physical characteristics which is bonded or otherwise united with the first material to form a unitary structure having the physical characteristics of both materials and which will retain the exact configuration of the mold and therefore remain within close tolerances.

BRIEF DESCRIPTION OF THE DRAWINGS

FIG. 1 is a perspective illustrating a boat constructed in accordance with the present invention;

FIG. 2, a perspective of the inner and outer hull shells employed in producing the boat;

FIG. 3, a section on the line 3—3 of FIG. 1;

FIG. 4, a section on the line 4—4 of FIG. 1;

FIG. 5, a section on the line 5-5 of FIG. 1;

FIG. 12, a perspective illustrating the inner and outer shells in a jig and the centrally held loops for the pipe through which the expandable filler is introduced;

FIG. 13, an enlarged fragmentary section through the hull of the completed boat;

FIG. 14, a vertical section through the hull of the finished boat;

FIG. 15, a vertical section of a modified mold member used in molding a modified outer shell;

FIG. 16, a vertical section of a modified mold member used in molding a modified inner shell;

FIG. 17, an enlarged fragmentary perspective of the modified outer shell illustrating the method of reinforcing the same; and, FIG. 18, an enlarged fragmentary perspective of the modified inner shell.

DESCRIPTION OF THE PREFERRED EMBODIMENTS

Figure 6:
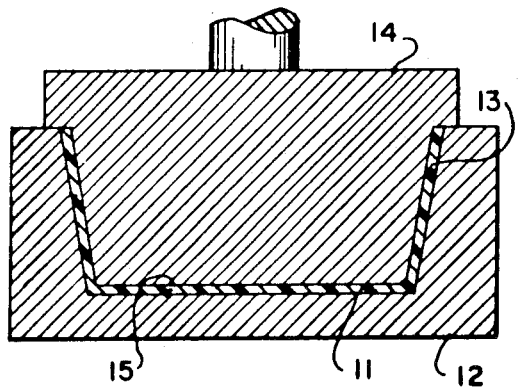
FIG. 6, a vertical section of the complementary mold members used in molding the outer shell.
Figure 7:
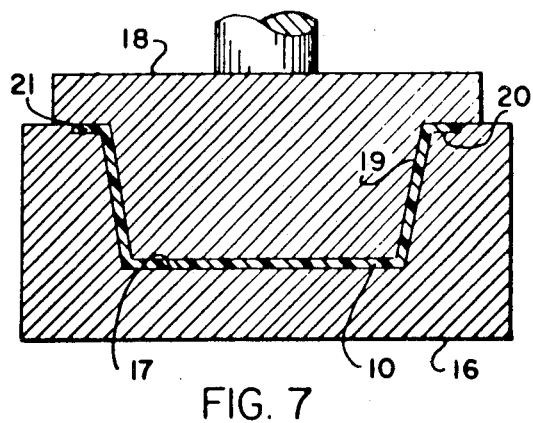
FIG. 7, a vertical section of the complementary mold members used in molding the inner shell.
Figure 8:
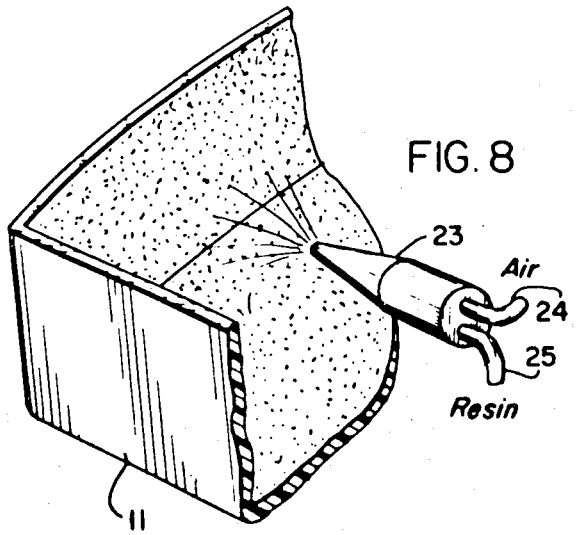
FIG. 8, a schematic perspective illustrating the spraying of resin onto the interior of the outer shell.
Figure 9:
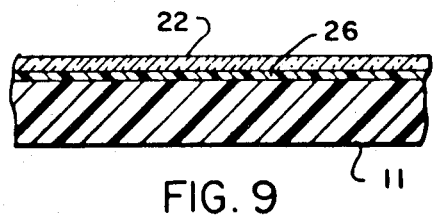
FIG. 9, an enlarged fragmentary section through the outer shell after the fiberglass and resin have been applied.
Figure 10:
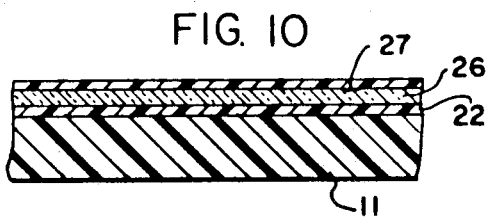
FIG. 10, a similar view to which an additional resin coat has been applied.
Figure 11:
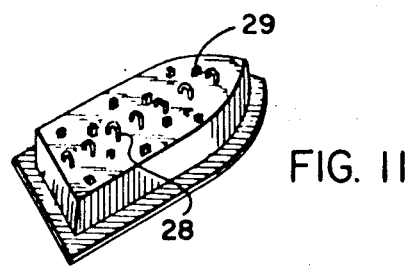
FIG. 11, a rear perspective of the inner hull shell with the tabs and loops applied.

With continued reference to FIGS. 1-14 of the drawings, the boat is manufactured of preformed inner and outer hull shells 10 and 11 produced in any desired manner as by placing thermoplastic sheets between two pairs of cooperative mold sections (FIGS. 6 and 7), the receiving mold section 12 having a cavity 13 corresponding to the exterior of the outer shell 11 and the received mold member 14 having an external configuration 15 corresponding to the internal configuration of the outer shell 11.

The plastic sheets are of a suitable thermoplastic material, for example, cellulose acetate or cellulose acetate butyrate and the mold sections are adapted to be supplied with heat so that the plastic sheets may readily be molded in the desired configuration.

The receiving mold member 16 has an internal cavity or configuration imparting surface 17 corresponding to the external configuration of the interior mold shell 10, and the receiving mold member 18 has an external mold configuration 19 corresponding to the interior of the hull shell 10. The mold members may be supplied with heat in any conventional manner for ready application of pressure by the mold members in the molding of the plastic sheets.

The mold member 16 may have a space 20 to cause a flange 21 to be formed on the inner hull shell 10 so that when the shells are nested, this flange will engage and overlie the upper edge of the outer shell 11 so that the space or chamber between the nested shells will be completely closed. The hull shells are given a coating of polyester resin 22 by means of a spray nozzle 23 supplied with air through a tube 24 and to which resin is admitted through a tube 25. Onto this coating of resin fiberglass 26 or other strengthening material is applied and over this an additional coating of resin 27 is applied sufficient to saturate the fiberglass and integrate the entire surface. If desired polyester resin 22 and cut or shredded fiberglass may be applied simultaneously in such a manner that the fiberglass is completely saturated. This provides a relatively rough surface with cavities and projections for excellent bonding with a filler and affords protection against chemical reaction between the plastic and the filler.

On the under surface of the inner shell are spotted or otherwise attached a central row of loops 28 and a series of spaced tabs or projections 29, the adjacent surfaces of the inner and outer shells having resin applied until saturated, then cut fiberglass 26, and then more resin 27, the inner shell having the loops and tabs.

While the resin is still moist and unset, reinforcing members are applied including a wooden bow reinforcing member 30 to reinforce and strengthen the shells as well as to accommodate a bolt 31 having an eye which receives one end of an anchor cable or a painter or mooring line. Also a stern reinforcing member 32 is provided for attaching a ski eye 33 at each rear corner and for supporting an outboard motor 34 thereon. Other reinforcing pieces 35 may be located along the sides and employed for the attachment of seat supports 36 for seats 37. It will be understood also that similar reinforcing pieces may be applied in suitable locations in order that a trim may be mounted thereon.

The inner and outer hull shells 10 and 11 are placed in a jig or form having a pair of supports 38 and 39 fastened together by a series of spaced rods 40 to provide the necessary support for the shells 10 and 11. The supports 38 and 39 are mounted on a base 41 on which the stern of the shells which form the boat are supported with the bow uppermost.

Between the shells 10 and 11 is introduced a filler of expandable plastic such as, for example, a plastic polyurethane foam 42 which hardens in about 30 minutes to give body, strength and rigidity to the hull of the boat as well as buoyancy, since the filler is of a specific gravity substantially less than that of water. The expandable plastic filler or foam 42 is introduced through a pipe 43 which extends downwardly through the loops 28 attached to the inner surface of the inner shell 10, the pressure of the foam introduced being such that the pipe would be caused to move if it were not for the loops. In filling the space between the shells the foam is discharged from the nozzle 44 first at the lowermost or stern end position and the hose is gradually withdrawn as the space between the hulls is filled from the stern to the bow.

With reference to FIGS. 15–18, a modified form of construction is provided in which molded objects such as inner and outer shells 45 and 46 are formed under controlled conditions of temperature and humidity. The material used to form the inner hull or shell 45 is a relatively thin layer of moldable thermoplastic material such as cellulose acetate, cellulose acetate butyrate or the like which is heated to a desired temperature and placed on a hollow male mold 47 having a plurality of openings 48 spaced throughout its upper surfaces. The mold 47 has a pipe 49 connected to a source of vacuum (not shown) for evacuating the air within the mold so that the thermoplastic material will conform to the upper portion of the mold by atmospheric pressure. If desired the pipe 49 may have a valve 50 for relieving the reduced pressure within the mold when desired so that the hull 45 can be removed therefrom.

In order to insure uniform molding of the hulls the molds are located within a room having a constant predetermined temperature, as for example, approximately 80° F. While the air remains evacuated from the mold, a coating of polyester resin or other heat setting or catalyst setting bonding agent 51 is sprayed onto the hull after which a layer of material having stable, high-strength characteristics such as fiberglass, hemp, sisal, jute, or other fibrous material 52 in mat or other form is applied. Thereafter, an additional coating of polyester resin or other bonding agent 53 is applied over the stable material in sufficient quantity as to saturate the stable material. The bonding agent is permitted to air dry for approximately 30 minutes after which the hull is removed from the mold. If desired, the fibers of the stable material may be separated from each other and mixed with the bonding agent so that both the stable material and the bonding agent can be sprayed onto the hull in one operation.

The outer hull 46 is formed in a similar manner in a hollow female mold 54 having an inner surface 55 of a configuration corresponding to the outer configuration of the outer hull 46. The inner surface 55 has a plurality of openings 56 providing communication to the interior of the mold 54. A pipe 57 connects the interior of such mold to a source of vacuum (not shown) for evacuating the air from the mold and causing the moldable thermoplastic material to conform to the mold by atmospheric pressure. A valve 58 is interposed in the pipe 57 for relieving the vacuum in the mold to permit the hull to be removed when desired.

After the plastic material has been heated and formed within the mold, a coating of polyester resin or other bonding agent 59 is applied to the inner surface of the outer hull after which a layer of stable, high-strength material such as fiberglass, hemp or the like 60 is applied and an additional coating of bonding agent 61 is applied in sufficient quantity to saturate the stable material. The bonding agent is permitted to air dry for approximately thirty minutes, after which the hull is removed from the mold. Again it is noted that the bonding agent and stable material can be applied in a single operation.

The outer hull 46 preferably is formed under the same controlled conditions as the inner hull 45 with the stable material and bonding agent being applied while the outer hull is held in position on the forming mold. The application of the stable material in this manner causes the individual hulls to be much stronger and have much greater impact strength as well as to be much more stable and substantially unaffected by variations in temperature.

After the hulls or shells are removed from the molds, they are placed in the jig and a filler of plastic polyurethane foam is applied therebetween as previously described.

It is noted that cellulose acetate or cellulose acetate butyrate is a relatively expensive material of unstable, low-strength characteristics, but is extremely pleasing to the eye. Therefore, it is desirable for the exposed portion of the finished article to be made of this material. Such material can be colored substantially any desired color and preferably an ultraviolet light inhibiter can be added during the forming of the sheets or can be applied to the sheets after they are formed. The ultraviolet light inhibiter will delay or entirely prevent deterioration of the material by light.

The stable high-strength backing material is integrally connected to the thermoplastic material while the thermoplastic material conforms to the exact configuration of the mold so that after the backing material has hardened and taken a substantially permanent set, the article can be stripped from the mold. Due to the stability and strength of the backing material, the outer surface of the plastic material will retain substantially the exact configuration of the mold and will not be subject to expansion and contraction by heat while in use. Also since the thermoplastic material is of substantially constant thickness, the finished object will have the same appearance and depth of color and beauty throughout.

We claim:

1. The method of making a boat comprising thermoforming inner and outer hull shells from cellulose acetate butyrate, applying a first relatively thin layer of adhesive type resin to the interior of the outer shell and to the exterior of the inner shell, applying fiberglass to the adhesive type resin on the interior of the outer shell and the exterior of the inner shell, applying a coating of adhesive type resin over the fiberglass sufficient to saturate the same, securing a row of pipe holding loops along the longitudinal center of the outer surface of the inner shell, placing said shells in spaced relation in a jig, removably inserting a flexible pipe within said loops, introducing a filler of expandable and hardenable polyurethane resin through said pipe to fill the space between said shells with said pipe being withdrawn as filling occurs, allowing said filler to harden, and removing said shells with said filler therebetween from said jig.

2. The method of making a molded body of predetermined shape comprising the steps of: providing a pair of vacuum molds having complementary molding surfaces, heating sheets of cellulose acetate butyrate to a moldable temperature and placing one sheet on each mold, evacuating the air from the area between said sheets and said molding surfaces to cause said sheets to conform to said molding surfaces and form complementary body portions, maintaining the air evacuated from said molds to retain the sheets in intimate engagement with said molding surfaces, applying moist resin and fiberglass to the exposed surfaces of said molded sheets to bond said fiberglass thereto, curing said resin and fiberglass, relieving the vacuum pressure within said molds to facilitate the removal of said body portions therefrom, connecting said complementary body portions in assembled relation, introducing a foamable polyurethane resin between said body portions, permitting said polyurethane resin to foam, and curing said foamed polyurethane resin, whereby said fiberglass permanently bonds to said body portions and seals the same to prevent a chemical reaction between the cellulose acetate butyrate and the polyurethane resin and said polyurethane resin foam permanently interlocks with said fiberglass to provide permanent buoyancy for said body.

3. The method of thermoforming and reinforcing a molded substantially rigid article to a substantially exact predetermined shape within close tolerances, comprising the steps of: providing a mold having a non-planar configuration-imparting surface, vacuum-applying means operatively associated with said surface, heating a thin sheet of normally rigid thermoplastic synthetic organic polymeric resin to a moldable temperature and applying the same to said mold with portions of said sheet in intimate engagement with said mold in a manner that the sheet will be drawn against said mold surface by vacuum, energizing said vacuum-applying means to evacuate the air from between said molding surface and one side of said sheet to cause at least said one side to conform to substantially the exact non-planar configuration of the surface of said mold, superimposing a reinforcing layer of fiberglass saturated with a polyester resin binder to the other side of said sheet while holding said one side in intimate engagement with and conforming to said non-planar molding surface by said vacuum, curing and hardening said resin binder while maintaining the vacuum between said sheet and said molding surface, releasing the vacuum to permit the removal of the reinforced molded article from the mold, and stripping said article from said mold, whereby said one side of said article retains the exact configuration of the molding surface and said sheet provides a coating for the reinforcing layer after the removal from the mold.

* * * * *